(12) United States Patent
Ikeda et al.

(10) Patent No.: US 7,147,273 B2
(45) Date of Patent: Dec. 12, 2006

(54) VEHICLE HOOD STRUCTURE

(75) Inventors: Koki Ikeda, Aichi-ken (JP); Hideki Ishitobi, Tokyo (JP)

(73) Assignee: Toyota Jidosha Kabushiki Kaisha, Aichi (JP)

( * ) Notice: Subject to any disclaimer, the term of this patent is extended or adjusted under 35 U.S.C. 154(b) by 50 days.

(21) Appl. No.: 10/946,130

(22) Filed: Sep. 22, 2004

(65) Prior Publication Data

US 2005/0082875 A1  Apr. 21, 2005

(30) Foreign Application Priority Data

Sep. 25, 2003  (JP) .............................. 2003-333494

(51) Int. Cl.
*B62D 25/10*  (2006.01)

(52) U.S. Cl. ................ 296/193.11; 180/69.21

(58) Field of Classification Search ........... 296/193.11; 180/69.2, 69.21
See application file for complete search history.

(56) References Cited

U.S. PATENT DOCUMENTS

| 5,124,191 A | * | 6/1992 | Seksaria | 428/178 |
| 6,883,627 B1 | * | 4/2005 | Staines et al. | 180/69.2 |
| 2004/0021342 A1 | * | 2/2004 | Fujimoto | 296/193.11 |

FOREIGN PATENT DOCUMENTS

| EP | 0 992 418 A2 | 4/2000 |
| EP | 1 516 803 A2 | 3/2005 |
| JP | 8-80873 | 3/1996 |
| JP | 2003-205866 | 7/2003 |
| JP | 2003-252246 | 10/2003 |
| WO | WO 02/47961 A1 | 6/2002 |

OTHER PUBLICATIONS

European Search Report dated Dec. 21, 2005.

* cited by examiner

*Primary Examiner*—Dennis H. Pedder
(74) *Attorney, Agent, or Firm*—Finnegan, Henderson, Farabow, Garrett & Dunner, LLP

(57) ABSTRACT

A vehicle hood structure in which a space is formed by a hood outer panel, which structures a vehicle body outer side portion of a hood, and an hood inner panel, which structures a vehicle body inner side portion of the hood, the vehicle hood structure having: step portions formed along a vehicle front-end direction in the hood outer panel; a plurality of convex portions which swell toward a vehicle body top side and which are formed along the vehicle front-end direction at predetermined intervals in a vehicle transverse direction, at a central region of the hood inner panel which is other than outer peripheral edge portions of the hood inner panel; joining portions formed at peak portions of the convex portions, and joined with the hood outer panel; and optionally, extending portions formed along configurations of the step portions from the convex portions nearest to the step portions. In accordance with this structure, there is no need to provide a separate impact absorbing body for the step portion formed at the hood outer panel.

10 Claims, 7 Drawing Sheets

VEHICLE HOOD STRUCTURE

CROSS-REFERENCE TO RELATED APPLICATION

This application claims priority under 35 USC 119 from Japanese Patent Application No. 2003-333494, the disclosures of which are incorporated by reference herein.

BACKGROUND OF THE INVENTION

1. Field of the Invention

The present invention relates to a vehicle hood structure, and in particular, to a vehicle hood structure which is applied to a vehicle such as an automobile or the like.

2. Description of the Related Art

In a vehicle hood structure which is applied to a vehicle such as an automobile or the like, a structure is conventionally known (see, for example, Japanese Patent Application Laid-Open (JP-A) No. 8-80873) in which a hood inner panel is provided at the reverse surface of a hood outer panel which has a convex planar portion and concave planar portions, the convex planar portion and the concave planar portions being sectioned off from one another by step portions. In this conventional structure, impact absorbing bodies are provided between the hood outer panel and the hood inner panel. The impact absorbing bodies are supported at the hood inner such that the impact absorbing bodies support vicinities of the step portions of the convex planar portion from the reverse surface thereof and, when the distance by which the hood is moved reaches a predetermined magnitude, the impact absorbing bodies crush-deform, and generate a desired reaction force.

However, in this vehicle hood structure disclosed in JP-A No. 8-80873, the impact absorbing bodies must be provided as separate bodies between the hood outer panel and the hood inner panel. As a result, an increase in the number of parts, an increase in the weight, and an increase in the assembly cost are inevitable. Further, as some portions of the impact absorbing bodies fail to collapse sufficiently at the time of a collision and such insufficiently collapsed portion cannot be utilized as the energy absorbing stroke, the overall energy absorbing stroke decreases.

SUMMARY OF THE INVENTION

In view of the aforementioned, an object of the present invention is to provide a vehicle hood structure in which there is no need to provide a separate impact absorbing body at a step portion formed in a hood outer panel.

In a first aspect of the present invention, a vehicle hood structure in which a space is formed by a hood outer panel, which structures a vehicle body outer side portion of a hood, and an hood inner panel, which structures a vehicle body inner side portion of the hood, comprises: step portions formed along a vehicle front-rear direction in the hood outer panel; a plurality of convex portions which swell toward a vehicle body top side and which are formed along the vehicle longitudinal direction at predetermined intervals in a vehicle transverse direction, at a central region of the hood inner panel which central region is other than outer peripheral edge portions of the hood inner panel; joining portions formed at peak portions of the convex portions, and joined with the hood outer panel; and extending portions formed along configurations of the step portions from the convex portions nearest to the step portions.

Accordingly, the convex side planar portions of the hood outer panel in vicinities of the step portions formed along the vehicle front-rear direction at the hood outer panel can be supported from the reverse surface side thereof by the extending portions which are formed, along the configurations of the step portions, from the convex portions which are formed at the hood inner panel along the vehicle longitudinal direction and which swell toward the top of the vehicle body and which are at positions which are closest to the step portions.

As a result, the energy, at the time when a colliding body collides with the convex side planar portion of the hood outer panel in a vicinity of the step portion, can be absorbed by the extending portion which is formed at the convex portion of the hood inner panel. Thus, there is the superior effect that there is no need to provide a separate impact absorbing body for the step portion formed at the hood outer panel.

In a second aspect of the present invention, a vehicle hood structure in which a space is formed by a hood outer panel, which structures a vehicle body outer side portion of a hood, and an hood inner panel, which structures a vehicle body inner side portion of the hood, comprises: step portions formed along a vehicle front-rear direction in the hood outer panel; a plurality of convex portions which swell toward a vehicle body top side and which are formed from a vehicle body front side toward a vehicle body rear side at predetermined intervals in a vehicle transverse direction, at a central region of the hood inner panel which central region is other than outer peripheral edge portions of the hood inner panel; and joining portions formed at peak portions of the convex portions, and joined with the hood outer panel, wherein the convex portions nearest to the step portions are provided along the step portions.

In accordance with this aspect, the concave portions, which swell toward the top of the vehicle body and which are formed in the hood inner panel along the vehicle longitudinal direction, are provided along the step portions which are formed in the hood outer panel along the vehicle front-rear direction. Thus, the convex side planar portions of the hood outer panel in vicinities of the step portions can be supported from the reverse surface side thereof by the convex portions of the hood inner panel.

As a result, the energy, at the time when a colliding body collides with the convex side planar portion of the hood outer panel in a vicinity of a step portion, can be absorbed by the convex portion of the hood inner panel. Thus, there is the superior effect that there is no need to provide a separate impact absorbing body for the step portion formed at the hood outer panel.

DETAILED DESCRIPTION OF THE INVENTION

Figure 1:
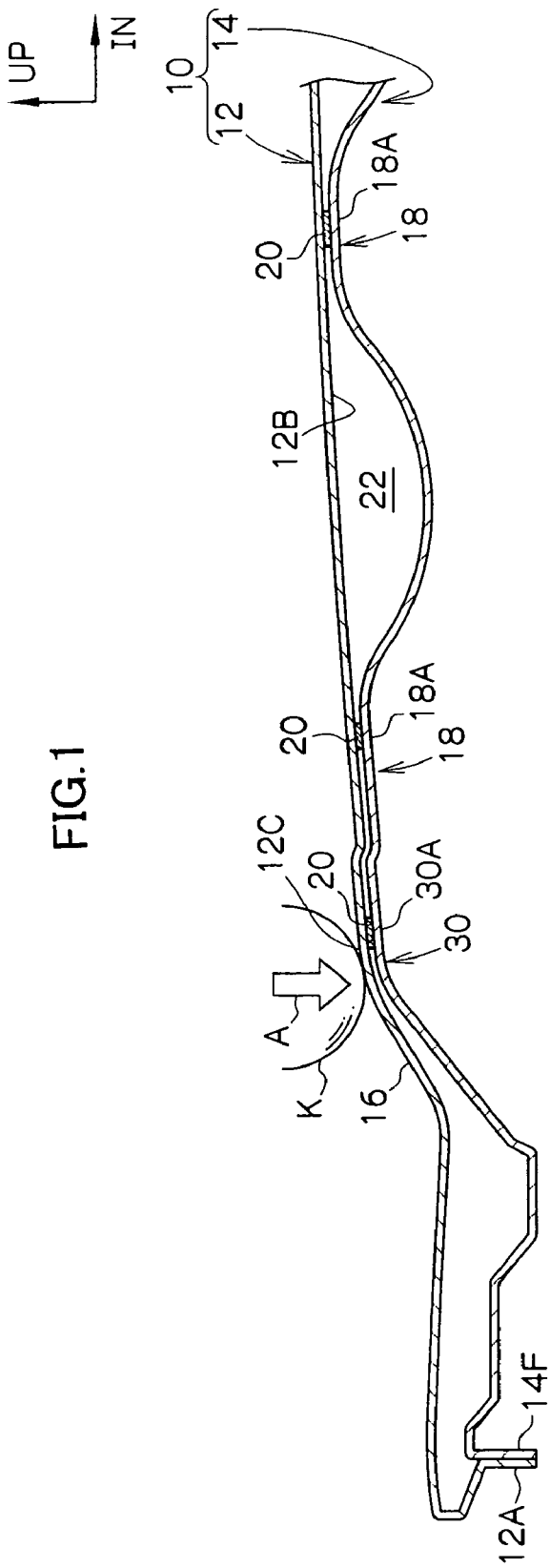
FIG. 1 is an enlarged sectional view taken along line 1—1 of FIG. 2.

A first embodiment of a vehicle hood structure of the present invention will be described in accordance with FIGS. 1 through 4.

Note that, in the drawings, arrow UP designates the upward direction of the vehicle, arrow FR designates the front direction of the vehicle, and arrow IN designates the direction toward the vehicle interior.

Figure 3:
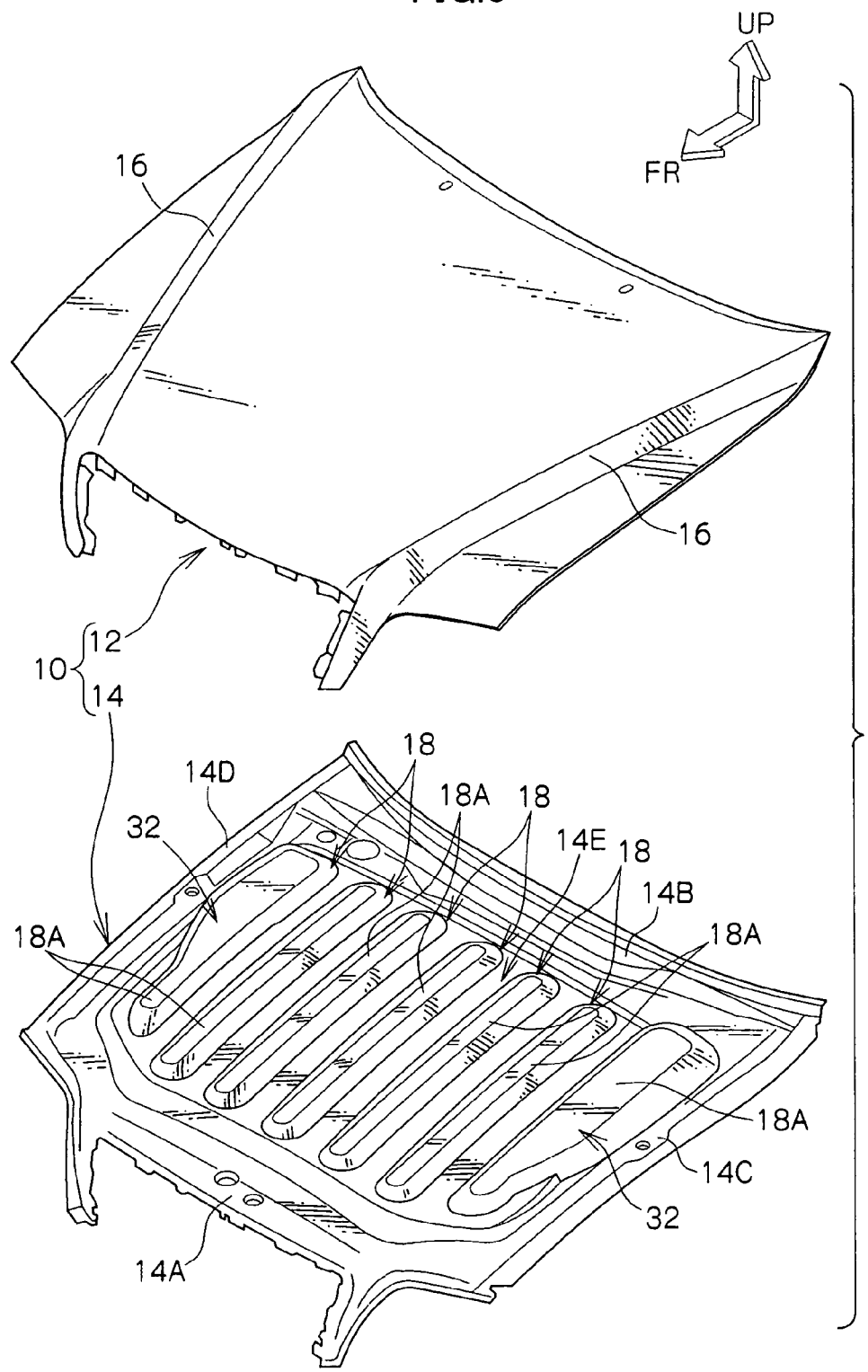
FIG. 3 is an exploded perspective view, as seen from the front of the vehicle body and at an angle, showing the vehicle hood structure relating to the first embodiment of the present invention.

As shown in FIG. 3, a hood 10 of the present embodiment has a hood outer panel 12 which structures the vehicle body outer side surface of the hood 10, and a hood inner panel 14 which is disposed at the inner side (the reverse surface side) of the hood outer panel 12 and structures the vehicle body inner side portion of the hood 10. The hood 10 is an aluminum hood having a hollow structure.

Step portions (relief portions) 16 are formed along the front-rear direction of the vehicle body (i.e., from a vehicle body front side to a vehicle body rear side), in vicinities of the both ends in the transverse direction of the vehicle, of the hood outer panel 12. The step portions 16 are formed from the vehicle transverse direction inner side at the vehicle body front side, toward the vehicle transverse direction outer sides along the direction toward the vehicle body rear side.

Figure 2:
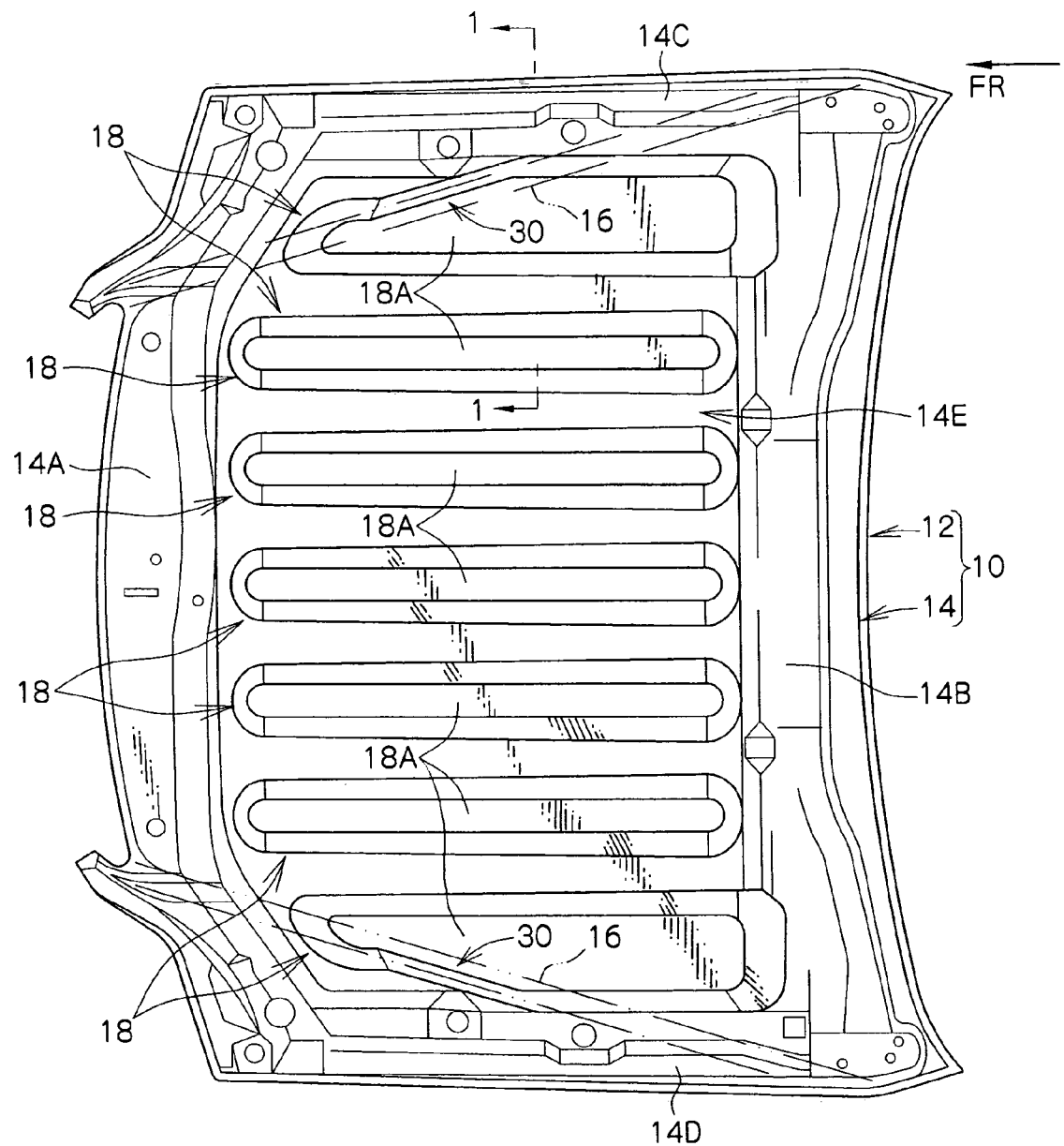
FIG. 2 is a plan view, as seen from beneath a vehicle body, showing a vehicle hood structure relating to a first embodiment of the present invention.

As shown in FIG. 2, a plurality of convex portions 18 are formed along the vehicle longitudinal direction at predetermined intervals in the vehicle transverse direction, at a central region 14E of the hood inner panel 14 of the hood 10. This central region 14E is other than a front end edge portion 14A, a rear end edge portion 14B, and left and right vehicle transverse direction outer side edge portions 14C, 14D which are the outer peripheral edge portions of the hood inner panel 14.

As shown in FIG. 1, flanges 12A are formed so as to be directed toward the bottom of the vehicle body at the vehicle transverse direction both end portions of the hood outer panel 12. The flanges 12A are connected to flanges 14F which are formed so as to be directed toward the bottom of the vehicle body at the vehicle transverse direction both end portions of the hood inner panel 14.

The convex portions 18 of the hood inner panel 14 swell toward the top of the vehicle body. Peak portions 18A of the convex portions 18 are joined to a reverse surface 12B of the hood outer panel 12 by an adhesive 20. Accordingly, a plurality of closed cross-sectional structures 22 are formed along the vehicle longitudinal direction by the hood inner panel 14 and the hood outer panel 12.

As shown in FIG. 2, the convex portions 18 of the hood inner panel 14 extend from the front end portion to the rear end portion of the central region 14E.

As shown in FIG. 1, extending portions 30 are formed along the configurations of the step portions 16, from the convex portions 18 which are formed at the vehicle transverse direction both end portions of the hood inner panel 14 and which are closest to the step portions 16 formed at the hood outer panel 12. Peak portions 30A of the extending portions 30 are joined by the adhesive 20 to the reverse surfaces of convex side planar portions 12C of the hood outer panel 12 which are adjacent to the step portions 16 at the vehicle transverse direction inner sides thereof.

Accordingly, cross-sectional configurations, as seen from the vehicle longitudinal direction, of the convex portions 18 which are positioned at the vehicle transverse direction both end portions of the hood inner panel 14 and at which the extending portions 30 are formed, are convex configurations at which the peak portions 18A and the peak portions 30A are continuous in the vehicle transverse direction. The hood outer panel 12 and the hood inner panel 14 are joined by the adhesive 20 in vicinities of the vehicle transverse direction both end portions of these continuous peak portions structured by the peak portions 18A and the peak portions 30A.

Figure 5:
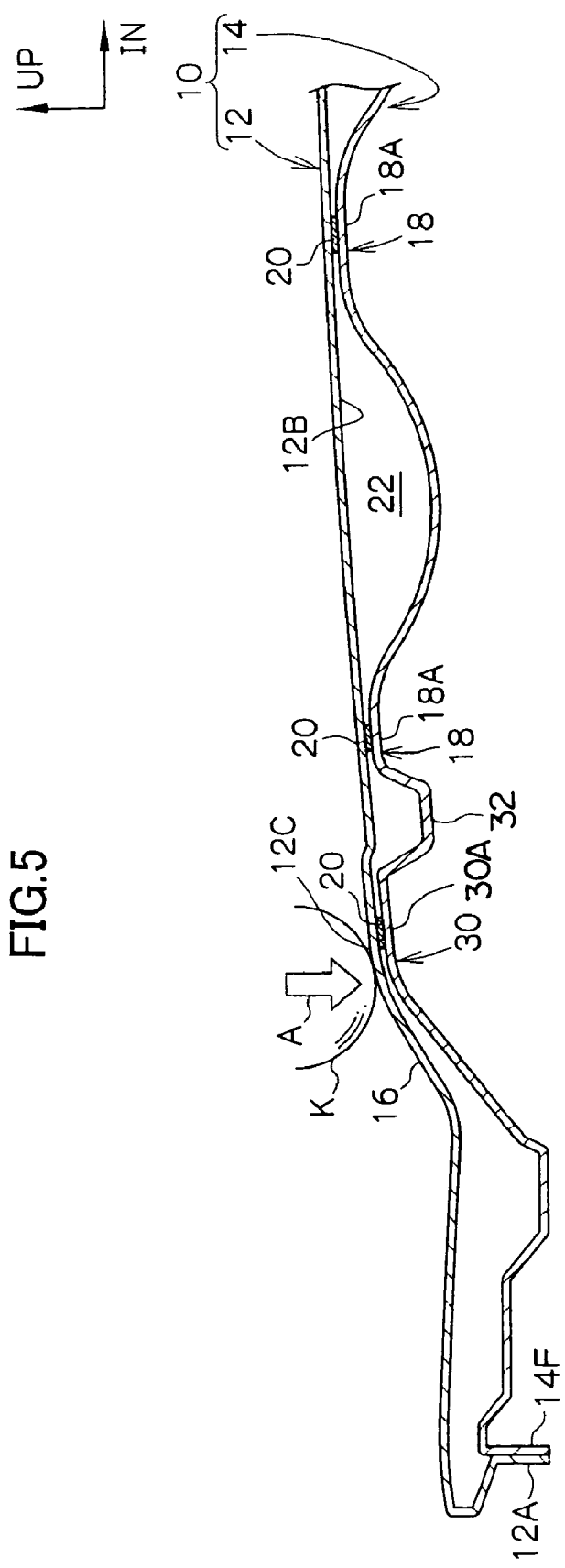
FIG. 5 is a sectional view, corresponding to FIG. 1, showing a vehicle hood structure relating to a modified example of the first embodiment of the present invention.

As shown in FIG. 5, if the width of this continuous peak portion structured by the peak portion 18A and the peak portion 30A is made wider due to a change in the design, the rigidity can be maintained by adding a concave bead 32 at the transverse direction central portion thereof.

As shown in FIG. 2, the configurations, as seen from the vertical direction of the vehicle body, of the convex portions 18 positioned at the vehicle transverse direction both end portions of the hood inner panel 14 are trapezoidal configurations having, at the vehicle transverse direction outer sides of the front portions thereof, the extending portions 30 which run along the step portions 16 shown by the two-dot chain lines in FIG. 2.

Next, operation of the present embodiment will be described.

In the present embodiment, the plural convex portions 18, which swell toward the top of the vehicle body, are formed along the vehicle longitudinal direction at predetermined intervals in the vehicle transverse direction, at the central region 14E which is other than the front end edge portion 14A, the rear end edge portion 14B, and the left and right vehicle transverse direction outer side edge portions 14C, 14D which are the outer peripheral edge portions of the hood inner panel 14. At the peak portions 18A of the respective convex portions 18, the hood inner panel 14 and the hood outer panel 12 are joined together by the adhesive 20. As a result, the rigidity of the hood 10 can be ensured by the plural closed cross-sectional structures 22 which are formed by the hood inner panel 14 and the hood outer panel 12 and which run along the longitudinal direction of the vehicle.

In the present embodiment, the extending portions 30 are formed, along the configurations of the step portions 16 which are formed along the vehicle front-rear direction at the hood outer panel 12, from the convex portions 18 which are formed along the vehicle longitudinal direction at the vehicle transverse direction both end portions of the hood inner panel 14, which swell toward the top of the vehicle body and which are positions closest to the step portions 16. Owing to these extending portions 30, the convex side planar portions 12C of the hood outer panel 12 in vicinities of the step portions 16 can be supported from the reverse surface 12B side.

As a result, the energy at the time when a colliding body K collides with the convex side planar portion 12C of the hood outer panel 12 in a vicinity of the step portion 16 can be absorbed by the extending portion 30 which is formed at the convex portion 18 of the hood inner panel 14. Thus, there is no need to provide a separate impact absorbing body for the step portion 16 formed at the hood outer panel 12.

Accordingly, it is possible to avoid an increase in the number of parts, an increase in the weight, and an increase in the assembly cost. Further, because insufficient collapsing as is the case with the prior art, in which some portions of the impact absorbing bodies fail to collapse sufficiently, does not arise at the time of a collision, the energy absorbing stroke can be made large.

Further, in the present embodiment, when the colliding body K collides with the convex side planar portion 12C of the hood outer panel 12 in a vicinity of the step portion 16, the free running distance of the colliding body K toward the bottom of the vehicle (in the direction of arrow A in FIG. 1) due to the deformation of the hood outer panel 12 can be made to be short. Thus, energy can be absorbed efficiently from immediately after the colliding body K collides with the hood 10.

Figure 4:
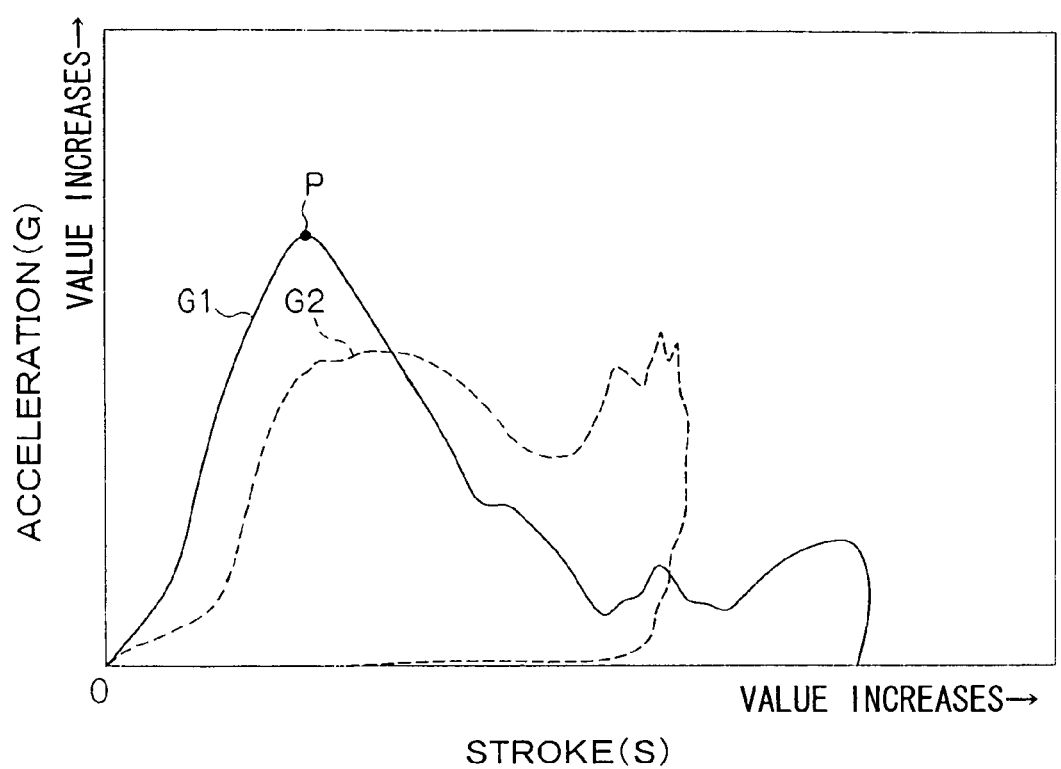
FIG. 4 is a graph showing the relationship between acceleration and the stroke of an absorbing body in the vehicle hood structure.

Therefore, as shown in FIG. 4, with regard to the change in acceleration G1 in relation to stroke S of the colliding body K in the present embodiment, the rise at the initial stage of the collision is fast and the acceleration of primary peak P is high therein, as compared with the change in acceleration G2 in relation to the stroke S of the colliding body K in a structure in which there is no supporting member beneath the convex side planar portion 12C of the hood outer panel 12 in the vicinity of the step portion 16. As a result, energy can be absorbed efficiently at the stage when the collision speed of the colliding body K is fast. Further, because the thickness of the hood 10 is small at this position, it is difficult for the impact to occur at the structures incorporated beneath the hood.

In the present embodiment, because the peak portions 30A at the extending portions 30 are joined by the adhesive 20 to the reverse surface 12B of the hood outer panel 12, the tensile rigidity of the hood 10 also is improved.

Next, a second embodiment of the vehicle hood structure of the present invention will be described in accordance with FIGS. 6 and 7.

Note that members which are the same as those of the first embodiment are denoted by the same reference numerals, and description thereof is omitted.

Figure 7:
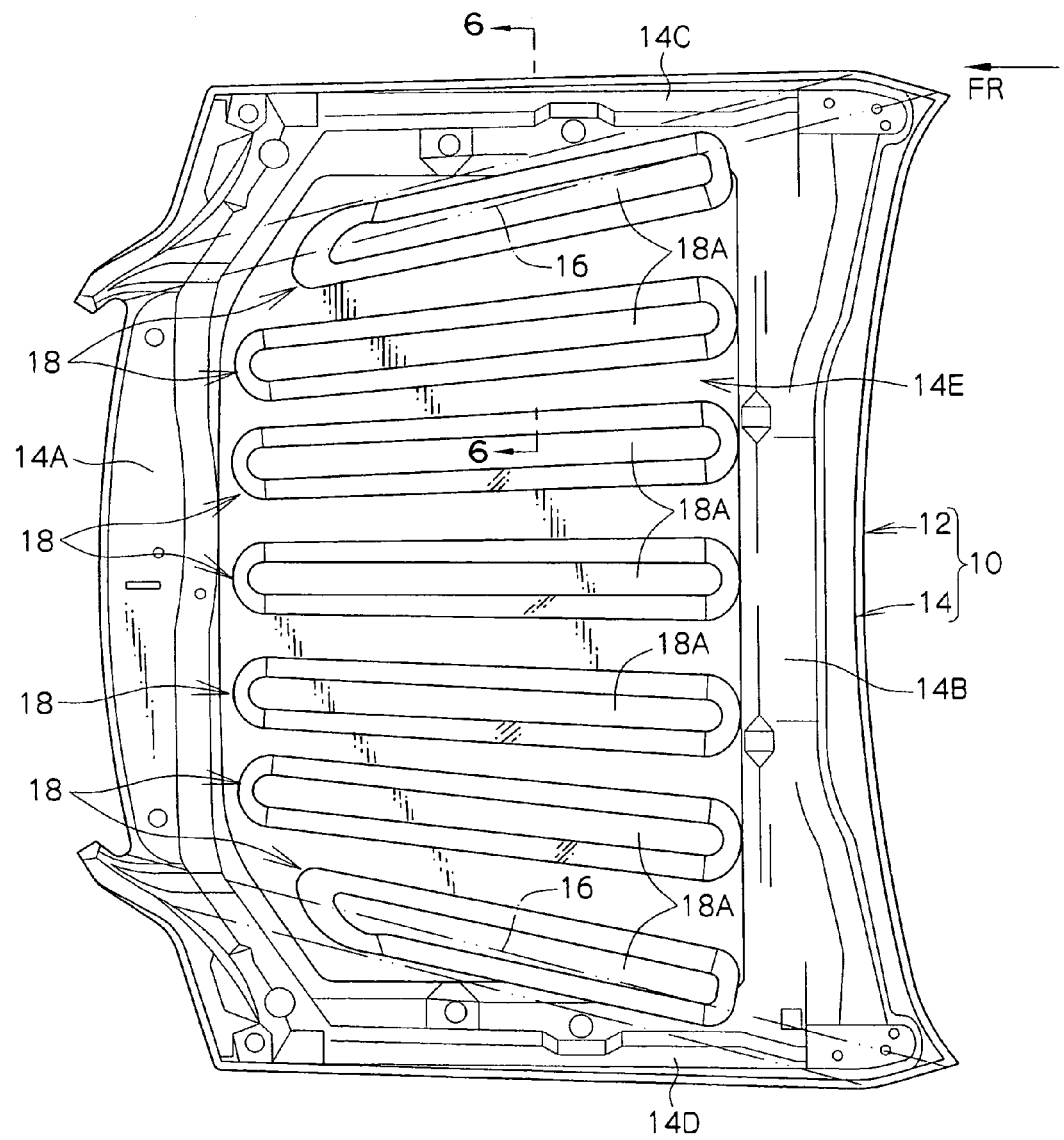
FIG. 7 is a plan view, as seen from beneath a vehicle body, showing a vehicle hood structure relating to a second embodiment of the present invention.

As shown in FIG. 7, in the present embodiment, the plural convex portions 18 formed at the hood inner panel 14 are arranged, in plan view, in the shape of a fan which opens from the vehicle front side toward the vehicle rear side. The convex portions 18 at the vehicle transverse direction both end portions, which are some of the plurality of convex portions 18, extend from the vehicle transverse direction inner side at the vehicle body front side toward the vehicle transverse direction outer sides along the direction toward the vehicle body rear side, along the step portions 16 formed at the hood outer panel 12.

Figure 6:
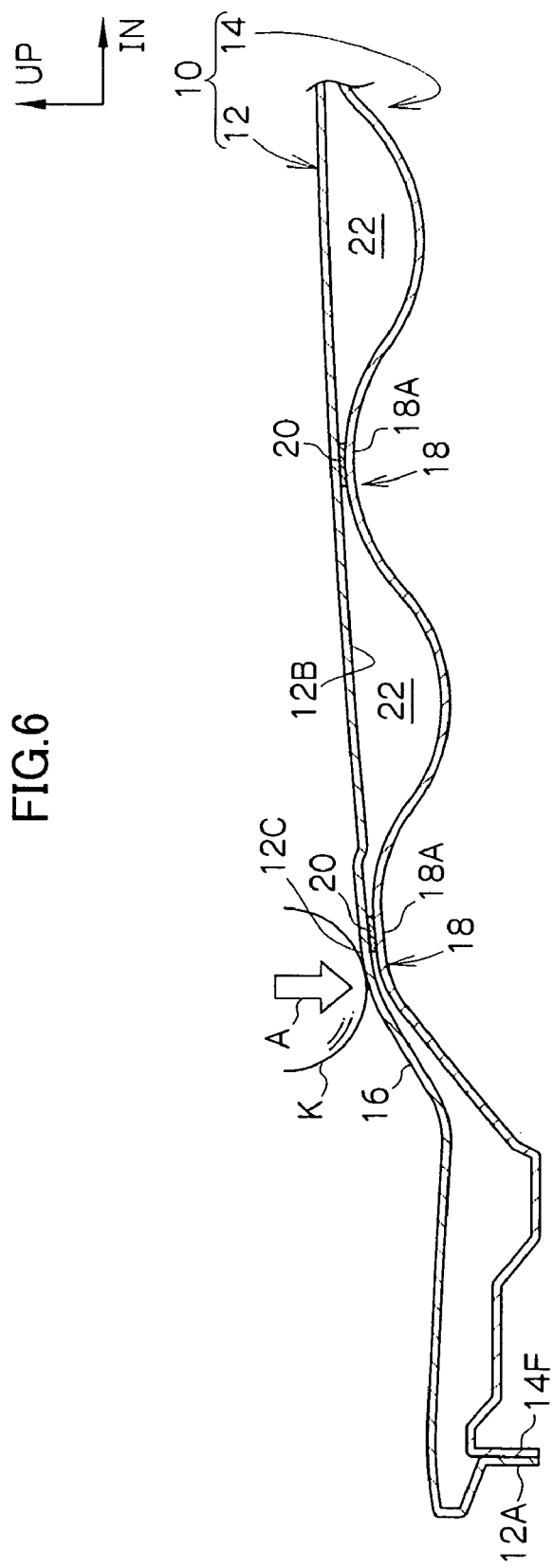
FIG. 6 is an enlarged sectional view taken along line 6—6 of FIG. 7.

As shown in FIG. 6, the peak portions 18A of the convex portions 18 at the vehicle transverse direction both end portions of the hood inner panel 14, are joined by the adhesive 20 to the reverse surface of the convex side planar portions 12C of the hood outer panel 12 which are adjacent to the step portions 16 at the vehicle transverse direction inner sides thereof.

Next, operation of the present embodiment will be described.

In the present embodiment, the plural convex portions 18, which swell toward the top of the vehicle body, are formed along the vehicle front-end direction at predetermined intervals in the vehicle transverse direction, at the central region 14E which is other than the front end edge portion 14A, the rear end edge portion 14B, and the left and right vehicle transverse direction outer side edge portions 14C, 14D which are the outer peripheral edge portions of the hood inner panel 14. At joining portions 18B, which are formed at the peak portions 18A of the respective convex portions 18, the hood inner panel 14 and the hood outer panel 12 are joined together by the adhesive 20. As a result, the rigidity of the hood 10 can be ensured by the plural closed cross-sectional structures 22 which are formed by the hood inner panel 14 and the hood outer panel 12 and which run along the longitudinal direction of the vehicle.

Further, in the present embodiment, a convex portions 18 is formed at the vehicle transverse direction both end portions along each of the step portions 16 which are formed along the vehicle front-rear direction at the hood outer panel 12, as some of the convex portions 18 which are formed along the vehicle front-end direction at the hood inner panel 14 and swell toward the top of the vehicle body. Owing to the convex portions 18 formed at the vehicle transverse direction both end portions of the hood inner panel 14, the convex side planar portions 12C of the hood outer panel 12 in vicinities of the step portions 16 can be supported from the reverse surface 12B side thereof.

As a result, the energy at the time when the colliding body K collides with the convex side planar portion 12C of the hood outer panel 12 in vicinities of the step portion 16 can be absorbed by the convex portion 18 which is formed at the vehicle transverse direction end portions of the hood inner panel 14. Thus, there is no need to provide a separate impact absorbing body for the step portion 16 formed at the hood outer panel 12.

Accordingly, it is possible to avoid an increase in the number of parts, an increase in the weight, and an increase in the assembly cost. Further, because insufficient collapsing as is the case with the prior art, in which some portions of the impact absorbing bodies fail to collapse sufficiently, does not arise at the time of a collision, the energy absorbing stroke can be made large.

Further, in the present embodiment, in the same way as in the first embodiment, when the colliding body K collides with the convex side planar portion 12C of the hood outer panel 12 in a vicinity of the step portion 16, the free running distance of the colliding body K toward the bottom of the vehicle (in the direction of arrow A in FIG. 6) due to the deformation of the hood outer panel 12 can be made to be short. Thus, energy can be absorbed efficiently from immediately after the colliding body K collides with the hood 10, and the effective stroke can be increased. Thus, it is difficult for the impact to occur at the structures incorporated beneath the hood.

The present invention has been described in detail above with reference to specific embodiments, but the present invention is not limited to these embodiments, and it should be apparent to those skilled in the art that other various embodiments are possible within the scope of the present invention. For example, in the above-described embodiments, the step portions 16 are formed in vicinities of the vehicle transverse direction both ends of the hood outer panel 12 from the vehicle transverse direction inner side at the vehicle body front side toward the vehicle transverse direction outer sides along the direction toward the vehicle body rear side. However, the vehicle hood structure of the present invention can also be applied to cases in which the step portions 16 are formed at other regions of the hood outer panel 12.

Further, although the hood 10 is an aluminum hood in the above-described embodiments, the material of the hood 10 is not limited to aluminum.

What is claimed is:

1. A vehicle hood structure, comprising:

a hood outer panel having a first front portion, a first rear portion, said first front portion and first rear portion defining a longitudinal direction, and first right and left side portions;

a hood inner panel, connected to said hood outer panel, having a second front portion, a second rear portion, and second right and left side portions, said second front portion, second rear portion, and second right and left side portions defining a central region;

step portions formed in said hood outer panel extending between said first front portion and said first rear portion, proximate said first right and left side portions;

a plurality of convex members defined in said central region of said hood inner panel extending in said longitudinal direction, extending alternately from said second front portion toward said second rear portion continuously and from said second rear portion toward said second front portion continuously, said plurality of convex members extending from an outer surface of said inner hood panel toward an inner surface of said outer hood panel with peak portions defined at selected locations in said convex members;

first joining means for joining a first plurality of selected peak portions to a first plurality of selected points in said inner surface of said outer hood panel; and second joining means for joining a second plurality of selected peak portions to a second plurality of selected points in said hood inner panel along said step portions.

2. The vehicle hood structure of claim 1, wherein said second joining means joins the second plurality of selected peak portions to selected points on said extending members.

3. The vehicle hood structure of claim 2, wherein lengths of the extending members extend between said first joining means and said second joining means.

4. The vehicle hood structure of claim 3, wherein said extending members include recessed beads between said first joining means and said second joining means.

5. The vehicle hood structure of claim 1, wherein said second joining means comprises an adhesive.

6. The vehicle hood structure of claim 1, wherein a portion of the convex portions proximate the side portions of the inner hood panel are colinear with said step portions.

7. The vehicle hood structure of claim 6, wherein the first joining means coincides with the second joining means of the convex members adjacent the step portions.

8. The vehicle hood structure of claim 6, wherein said plurality of convex portions define a fan shape when viewed from above.

9. The vehicle hood structure of claim 8, wherein said fan shape defined by said plurality of convex members opens proximate said rear portion of said inner panel.

10. The vehicle hood structure of claim 6, wherein the first joining means is an adhesive.

* * * * *